United States Patent Office 2,734,890
Patented Feb. 14, 1956

2,734,890

UREIDOALKYL VINYL ETHERS

Newman M. Bortnick, Oreland, and Sidney Melamed, Philadelphia, Pa., assignors to Rohm & Haas Company, Philadelphia, Pa., a corporation of Delaware No Drawing. Application April 10, 1953,
Serial No. 348,103

20 Claims. (Cl. 260—77.5)

This invention deals with ureidoalkyl vinyl ethers, polymers thereof, and copolymers of a said ether and one or more other polymerizable vinylidene compounds. It also deals with methods of preparing these monomers, polymers, and copolymers.

The present application is a continuation-in-part of copending applications Serial Nos. 282,693; 282,695; and 282,700, all of which were filed on April 16, 1952 and have since been abandoned.

Aminoalkyl vinyl ethers are known. They are not readily polymerized with small amounts of acid catalysts or free radical catalysts. Alkyl vinyl ethers, on the other hand, are readily polymerized with acid catalysts and are but slightly affected by normal concentrations of peroxidic catalysts. In contrast the ureidoalkyl vinyl ethers of this invention are polymerizable under the influence of azo catalysts, although they do not respond to catalytic quantities of acids or to peroxides whether organic or inorganic under the various conditions which are known to result in polymerization of many vinylidene compounds including other types of vinyl compounds.

Amino-substituted vinyl ethers have been reported to polymerize with molar proportions of sulfur dioxide to give products of relatively low molecular weight which contain units from sulfur dioxide. It has been found that ureidoalkyl vinyl ethers likewise polymerize with molar proportions of sulfur dioxide to form products which have low molecular weight and which include sulfur dioxide as a component. These polymers differ in both these respects from the polymers of high molecular weight which are formed in the presence of azo catalysts from ureidoalkyl vinyl ethers.

The polymers of this invention furthermore are distinct from polymers of allyl derivatives, such as allylurea, which forms only low molecular weight polymers at best. The ureido group actually destroys the ability of alkyl vinyl ethers to respond to acid catalysts. Allylurea, for example, is a powerful chain transfer agent which inhibits formation of other polymers.

The ethers of this invention are prepared from aminoalkyl vinyl ethers of the formula $$RHN-A-O-CH=CH_2$$

wherein R is hydrogen or a hydrocarbon group and A is an alkylene group. When R is a hydrocarbon group, it may readily contain 18 or more carbon atoms and may be alkyl, alkenyl, alkynyl, cycloalkyl, aralkyl, or aryl. It preferably contains not over 10 carbon atoms. The alkylene group is of straight or branched chain structure with at least two carbon atoms between oxygen and nitrogen. It may conveniently have two to eighteen carbon atoms.

In a preferred type of structure the group A may be represented by

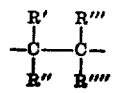

where R', R", R''', and R'''' represent hydrogen or alkyl groups or one of these is alkenyl, phenyl or benzyl. When the group A contains two to three carbon atoms and R is hydrogen or methyl, the compounds are of special interest as they and their simple derivatives tend to be water-soluble. With larger carbon content the ethers tend to be organic solvent-soluble and to exhibit quite different properties from the first members of the series.

Typical vinyl ethers useful as starting materials include the following:

$CH_2=CHOCH_2CH_2NH_2$ $CH_2=CHOCH_2CH_2NHCH_3$ $CH_2=CHOCH_2CH_2CH_2NH_2$ $CH_2=CHOCH_2CH(CH_3)NH_2$ $CH_2=CHOCH(CH_3)CH_2NH_2$ $CH_2=CHOCH_2C(CH_3)_2NH_2$ $CH_2=CHOC(CH_3)_2CH_2NH_2$ $CH_2=CHOCH_2CH_2CH_2CH_2NH_2$ $CH_2=CHOC(CH_3)_2CH_2CH(CH_3)NH_2$ $CH_2=CHOCH_2CH_2CH(CH_3)(CH_2)_3C(CH_3)_2NH_2$ $CH_2=CHOCH_2C(CH_3)_2CH_2NH_2$ $CH_2=CHOCH_2CH(CH_3)NHCH_3$

The vinyl aminoalkyl ether may have an N-substituent other than the preferred methyl group, such as ethyl, butyl, phenyl, methylphenyl, butylphenyl, benzyl, methylbenzyl, cyclohexyl, and so on, typical compounds then being $CH_2=CHOCH_2CH_2NHC_6H_5$ (distilling at 128°–130° C./9 mm.), $CH_2=CHOCH_2CH_2NHC_4H_9$ (distilling at 88°–99° C./120 mm.), $CH_2=CHOCH(CH_3)CH_2NHC_2H_5$ (distilling at 72°–73° C./120 mm.), $CH_2=CHOCH_2CH_2NHCH_2C_6H_5$ $CH_2=CHOCH_2CH(CH_3)NHC_6H_4CH_3$ $CH_2=CHOCH_2CH_2NHC_6H_{11}$ $CH_2=CHOCH_2CH_2NHCH_2CH=CH_2$ $CH_2=CHOCH_2CH_2NHCH_2CH=CHCH_3$ $CH_2=CHOCH_2CH_2NH(CH_2)_9CH=CH_2$ $CH_2=CHOCH_2CH_2NHC_{18}H_{33}$ (2 double bonds soya amine), $CH_2=CHOCH_2CH_2NHC_{18}H_{35}$ (oleyl amine),

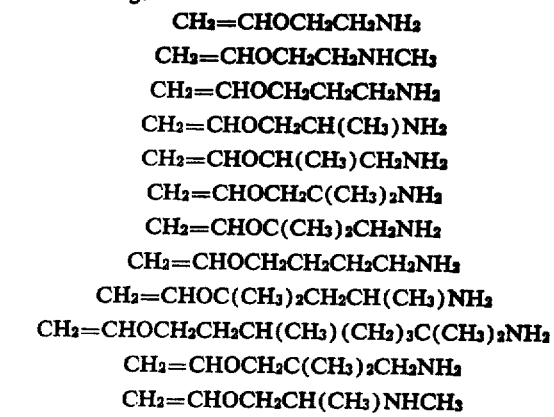

(from butadiene monoxide),

(from vinylcyclohexene monoxide), $CH_2=CHOCH_2CH_2NHCH_2CH_2C\equiv CCH_3$ etc.

The last compound is available, for example, through the reaction of methylacetylene and ethylene oxide to yield $CH_3C\equiv CCH_2CH_2OH$, which is converted to the chloride with thionyl chloride, the chloride being then reacted with ethanolamine to form the alcohol $$RNHCH_2CH_2OH$$

where R is an alkynyl group. This alcohol reacts with acetylene to form the desired vinyl ether. In forming alkynyl derivatives it is preferred that the multiple linkage occur between intermediate carbons rather than at a terminal carbon.

The alkylene group may be substituted with other than aliphatic groups and may be interrupted with heteroatoms. Also the chain of A may be part of a cycle. Examples of compounds of these sorts are $$CH_2=CHOC_6H_{10}NH_2$$

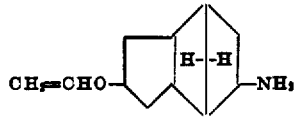

$$CH_2=CHOCH_2CH_2C_6H_{10}C(CH_3)_2NH_2$$
($C_6H_{10}$ being the cyclohexyl nucleus)

$$CH_2=CHOCH(C_6H_5)CH_2NH_2$$

$$CH_2=CHOCH_2CH_2C(CH_3)(C_6H_5)NH_2$$

$$CH_2=CHOCH_2CH_2OCH_2CH_2NH_2$$

$$CH_2=CHOCH_2CH_2OCH_2CH(CH_3)NH_2$$

$$CH_2=CHOCH_2CH_2OCH_2CH_2NHCH_3$$

$$CH_2=CHOCH_2CH_2OCH_2CH_2NHC_6H_5$$

$$CH_2=CHOCH_2CH_2OCH_2CH_2NHCH_2C_6H_5$$

$$CH_2=CHOCH_2CH_2SCH_2CH_2NH_2$$

$$CH_2=CHOCH_2CH_2NHCH_2CH_2NH_2$$

$$CH_2=CHOCH_2CH_2OCH_2CH_2NHC_2H_5$$

$$CH_2=CHOCH_2CH_2OCH_2CH_2OCH_2CH_2NH_2$$

etc. The above compounds and others comparable to them are capable of reacting to form the ureidoalkyl vinyl ethers of this invention.

An aminoalkyl vinyl ether is reacted with a water-soluble inorganic cyanate in the presence of acid. The cyanate is preferably an alkali metal cyanate, such as sodium or potassium cyanate. With such cyanate the reaction temperatures are usually held between 0° and 50° C., although temperatures up to 60° C. can be used for short periods of time.

The preferred acids are the strong non-oxidizing mineral acids, such as sulfuric acid, phosphoric, or hydrochloric acid. The relatively strong organic acids, such as formic or acetic, can also be used. A combination of excess acid and vinyl ether is avoided, as vinyl ethers are sensitive to free strong acid. Hence, in effecting the reaction, cyanate and aminoalkyl vinyl ether are mixed and acid is added to the mixture. The acid is generally used in a diluted form, the range of 2% to 40% of acid being useful, but a more concentrated solution could be judiciously added to a dilute reaction mixture.

This process then requires mixing of aminoalkyl vinyl ether and water-soluble cyanate with regulated addition of acid in no more than the theoretical amount with the temperature controlled. The pH of the reaction mixture is maintained at a value of at least 6.8. The process thus differs from those superficially resembling it in the critical details of ratio of reactants, mode of addition, temperature, and pH.

For the preferred type of aminoalkyl vinyl ethers the reaction may be represented as follows:

$$CH_2=CHOC_nH_{2n}NHR+MCNO+HX\rightarrow$$
$$CH_2=CHOC_nH_{2n}N(R)CONH_2+MX$$

where M is a salt-forming group or metal, X is the anion of a strong non-oxidizing acid, $C_nH_{2n}$ represents an alkylene group of two to eighteen carbon atoms, and R is a hydrocarbon group, especially an alkyl group of not over four carbon atoms, a benzyl, a phenyl, a cycloalkyl, or an alkenyl group, or hydrogen.

The reaction takes place conveniently in solution, aqueous solutions being useful when the aminoalkyl vinyl ether is soluble therein. Temperatures between about 0° and about 50° C. are ordinarily used. The reactants are mixed, the reaction is allowed to proceed, and the solvent is removed. The product is conveniently separated and may often be purified through crystallization from an organic solvent.

Typical preparations by this method follow.

*Example 1*

A reaction vessel equipped with stirrer, condenser, dropping funnel, and thermometer was charged with 648 parts by weight of potassium cyanate, 522 parts by weight of 2-aminoethyl vinyl ether, and 1000 parts by weight of water. The mixture was stirred and treated with 589 parts by weight of aqueous 37% hydrochloric acid diluted with 500 parts by weight of water. This acid solution was added over a period of five hours with cooling of the reaction mixture to maintain it at about 30° C. The pH of the solution was frequently determined and was never allowed to drop below 6.8. But only after 90% of the acid had been added was careful addition of acid required. The resulting mixture was left standing for 16 hours. Water and other volatile materials were taken off under reduced pressure with heat being supplied by a steam bath. The residual slurry was treated with 2350 parts by weight of dry ethylene dichloride. The slurry and solvent mixture were heated under reflux for about 15 minutes and filtered. Crystals formed in the filtrate and were collected and dried. They amounted to 710 parts of ureidoethyl vinyl ether having a melting point of 73°–74° C. This product was obtained as white needle crystals. The product contained by analysis 21.4% of nitrogen (theory 21.5%).

Ureidoethyl vinyl ether is soluble in water, acetone, hot ethylene dichloride, ethanol, dimethylformamide, methyl acrylate, vinyl acetate, vinyloxyethanol, and acrylonitrile. It is slightly soluble in hot benzene, but practically insoluble in petroleum ether. When the compound is heated, it becomes amber colored and gives off gas at 153° C.

The above method was applied to the reaction of 3-aminopropyl vinyl ether to form 3-ureidopropyl vinyl ether, a white, crystalline solid, melting at 83.5–85° C. The product as obtained contained by analysis 19.2% of nitrogen (theory 18.9%). The properties of this ether are similar to those of ureidoethyl vinyl ether, described above. In the case of larger ureidoalkyl vinyl ethers, however, solubilities decrease with respect to the more polar solvents, these ethers being insoluble in water and more soluble in hydrocarbons.

*Example 2*

A mixture of 115 parts by weight of β-aminoisobutyl vinyl ether (boiling point, 125° C.) and 78 parts of sodium cyanate in 200 parts of water was stirred and treated with 108 parts by weight of 37.1% hydrochloric acid. The temperature of the reacting mixture was maintained between 25° and 30° C. by cooling. The mixture was stirred and kept at about this temperature for eight hours. It was then chilled. The solid which formed was separated by filtration. The filtrate was extracted with ethylene dichloride, which was then used for recrystallization of the filtered solid by taking up the solid in the hot extract. The resulting solution was filtered to remove salt and was cooled. A white crystalline solid formed, was separated by filtration, and was dried. It melted at 115°–117° C. and corresponded in composition to β-ureidoisobutyl vinyl ether,

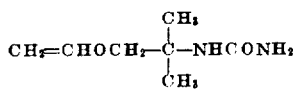

This compound is soluble in methanol, hot water, hot benzene, and hot ethylene dichloride.

In the same way other vinyl aminoalkyl ethers in which the amino group has a hydrogen on the amino nitrogen atom can be converted to the vinyl ureidoalkyl ether corresponding thereto. Thus, vinyl aminobutyl ether yields vinyl ureidobutyl ether, vinyl aminohexyl ether yields vinyl ureidohexyl ether, vinyl 4-amino-1,4,4-trimethylbutyl ether yields vinyl 4-ureido-1,4,4-trimethylbutyl ether, vinyl N-methyl-amino ether yields vinyl N-methyl-ureidoethyl ether, etc.

*Example 3*

The reaction vessel described in Example 1 was charged with 35 parts of potassium cyanate, 32 parts of N-methylaminoethyl vinyl ether, and 50 parts of water. The mixture was stirred and slowly treated with 60 parts of 18% hydrochloric acid solution. During the addition of the acid the temperature of the reaction mixture was kept between 30° and 40° C. The reaction mixture was warmed on a steam bath and volatile material was taken off under reduced pressure. The residue was taken up in ethylene dichloride with heating. The hot mixture was filtered, and the filtrate was cooled to yield crystals. They melt at 64°–66° C. and correspond in composition to

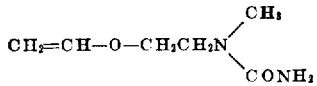

*Example 4*

A solution is prepared of 23.6 parts of 8-vinoxy-2-amino-2,6-dimethyloctane in 150 ml. of methanol. The 8-vinoxy-2-amino-2,6-dimethyloctane is obtained by reaction of acetylene on 7-amino-3,7-dimethyloctanol in the presence of potassium hydroxide. This amino alcohol is in turn obtained from citronellol by reaction with hydrogen cyanide and sulfuric acid. Potassium cyanate, 8.1 parts, is added to the methanol solution described above and the resultant slurry while stirred efficiently is treated slowly with 3.65 parts of hydrogen chloride in the form of a 37% solution in water at 30°–35° C. The resulting mixture is stirred for eight hours and diluted with water. An oil separates which is collected by extraction with benzene. The dried benzene solution is concentrated to remove solvent and finally freed of starting amine at high vacuum to give a dark viscous oil containing 11.3% of nitrogen. It thus corresponds in composition to the compound

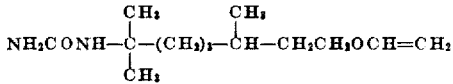

for which the theoretical nitrogen content is 11.6%. The yield is 40%.

*Example 5*

There are mixed 164 parts of N-cyclohexylaminoethyl vinyl ether and 90 parts of potassium cyanate in 500 parts of methanol. While this mixture is well stirred, a 37% hydrochloric acid solution is slowly added to a total of 100 parts. The resulting solution is stirred for eight hours and diluted with water. An oil forms and is separated. It has a molecular weight of 212 and contains 13.5% of nitrogen. It is N-cyclohexylureidoethyl vinyl ether,

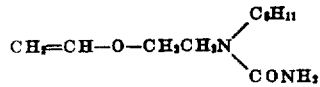

*Example 6*

In the same way there are reacted 213 parts of N-3,5,5-trimethylhexylaminoethyl vinyl ether, 90 parts of potassium cyanate, and 100 parts of 37% hydrochloric acid. The product is obtained as an oil which is difficult to crystallize. It has a molecular weight of 257 and contains 11.0% of nitrogen corresponding thus to the compound

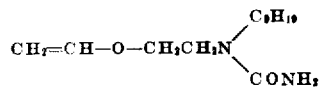

for which the theoretical nitrogen content is 10.9%.

Other aminoalkyl vinyl ethers may similarly be converted to ureas by treatment with dilute hydrochloric acid and potassium cyanate in aqueous solution. As another example of a somewhat different starting compound there may be cited the reaction of 15.9 parts of N-vinoxyethyl-N-ethoxyethylamine, $$CH_2=CHOCH_2CH_2NHCH_2CH_2OC_2H_5$$

and 8.2 parts of potassium cyanate which are slurried in water. Thereto is added aqueous 10% hydrochoric acid solution containing 3.7 parts of hydrogen chloride. The product is isolated as a low melting solid which is soluble in water and alcohol. This product has the formula

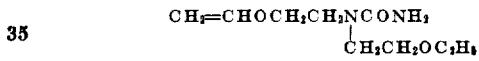

the alkoxyalkyl group being here equivalent to an alkyl substituent.

Similarly, there are reacted 131 parts of β-aminoethoxyethyl vinyl ether, $$NH_2CH_2CH_2OCH_2CH_2OCH=CH_2$$

85 parts of potassium cyanate, and dilute hydrochloric acid containing 36.5 parts of hydrogen chloride. The product is vinoxyethoxyethylurea, a water-soluble solid.

Similarly, there are reacted 79 parts of N,N-di(vinoxyethyl)amine, 45 parts of potassium cyanate and dilute hydrochloric acid containing 18.3 parts of hydrogen chloride. The product is N,N-di(vinoxyethyl)urea.

*Example 7*

The process used in Example 3 is applied to β-N-benzylaminoethyl vinyl ether (177 parts), but as a solvent medium there is used a 1:1 mixture of dioxane and water. At the end of the reaction water and dioxane are stripped off by heating under reduced pressure. The viscous residue is extracted with water and the product is taken up in benzene, which is dried and stripped by heating under reduced pressure. There is thus obtained a glassy solid which corresponds in composition to N-benzyl-N-vinoxyethylurea.

*Example 8*

A solution of N - (alpha-methylbenzyl)aminoethyl vinyl ether, 57.3 parts in 60 parts of methanol, is mixed with 29.2 parts of potassium cyanate and the well-stirred suspension is treated slowly with a solution of 32.5 parts of 37% hydrochloric acid in 60 parts of methanol at 30°–39° C. The mixture is allowed to stand at room temperature overnight and is then concentrated under diminished pressure to give a solid residue of salt and product. The product is dissolved in hot ethanol and separated from the potassium chloride by filtration. The ethanol solution is treated with water to a faint cloud and cooled to give 64 g. of product, a 91% yield, as a white solid, melting at 84° C. It contains by analysis 66.8% of carbon, 7.8% of hydrogen, and 12.04% of nitrogen. The calculated values are 66.6%, 7.69%, and 11.97%, respectively, and the product is therefore represented by the following formula:

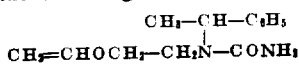

In a similar manner 4-amino-4-methyl-2-pentyl vinyl ether is converted to 4-ureido-4-methyl-2-pentyl vinyl ether and 4-amino-4-methyl-1-pentyl vinyl ether is converted to 4-ureido-4-methyl-1-pentyl vinyl ether. These are obtained as viscous liquids which give nitrogen analyses satisfying the theoretical requirements. After long storage in a refrigerator the latter of these solidifies.

*Example 9*

A mixture of 95.5 parts of 3-amino-3-phenylbutyl vinyl ether and 40.5 parts of potassium cyanate is charged to a reaction vessel and 250 parts of 50% aqueous ethanol is added. While this heterogeneous system is rapidly stirred, there are added 183 parts of aqueous 10% hydrochloric acid. The temperature of the reaction mixture is held at 30° to 40° C. As the reaction proceeds, an oil separates. The reaction mixture is finally diluted with ice water and stirred. The oil solidifies and is separated by filtering. It corresponds in composition to 3-ureido-3-phenyl-butyl vinyl ether.

In a similar manner α-phenyl-β-aminoethyl vinyl ether (from the reaction of acetylene and α-phenyl-β-aminoethanol, the latter being obtained from styrene oxide and ammonia) is converted to α-phenyl-β-ureidoethyl vinyl ether.

Another method for preparing ureidoalkyl vinyl ethers is through reacting an aminoalkyl vinyl ether and urea by heating a mixture thereof at temperatures above 100° C. up to about 150° C. with evolution of ammonia. The resulting residue is essentially the desired ureidoalkyl vinyl ether, although it may be perhaps less pure than that obtained by reaction of amine, cyanate, and acid as described above.

The reaction is improved and the purity of the product is better when there is present in the reaction mixture between 0.5% and 5% of a water-soluble basic salt of a strong base and a weak acid. For this purpose there may be used sodium or potassium carbonate, potassium cyanate, sodium acetate, sodium borate, alkaline sodium phosphate, or the like.

The fusion product is sufficiently pure for many purposes, such as resin formation. It may, however, be purified by recrystallization from aqueous solutions and/or organic solvent solutions.

Typical preparations according to this method follow.

*Example 10*

A mixture of 30 parts by weight of urea and 44 parts of 2-aminoethyl vinyl ether was charged to a vessel equipped with thermometer and condenser. The outlet of the condenser was connected with a tower for absorbing ammonia in water. The mixture was heated with evolution of ammonia beginning at about 115° C. Heating was continued to a temperature of 135° C. The ammonia absorbed corresponded to 83% of that theoretically available by this reaction. When the reaction mixture was cooled, it was treated with ethylene dichloride and the product was obtained by crystallization of the solution. There was obtained a yellowish white solid which melted at 65°–68° C. and amounted to 46 parts, a yield of 70%. This product was essentially ureidoethyl vinyl ether, but was difficult to purify by recrystallization.

*Example 11*

A mixture of 60 parts of urea, 87 parts of 2-aminoethyl vinyl ether, and 1.74 parts of potassium cyanate was heated for a period of three hours up to a temperature of 140° C. with evolution of ammonia. The reaction mixture was treated with 300 parts of ethylene dichloride and this mixture was heated to reflux and filtered hot. The filtrate was cooled and 121 parts of a white product were collected therefrom. It corresponded in composition to ureidoethyl vinyl ether. The crystalline product as thus obtained melts at 68°–69° C. Upon recrystallization from butanol the crystals melt at 73°–74° C.

*Example 12*

A mixture of 31.5 parts of 1-amino-2-vinoxyoctadecane and an equal weight of urea is fused with stirring. Reaction is noted at about 115° C. and proceeds more rapidly as the temperature of the mixture is raised to 140° C. About two hours are consumed in thus raising the temperature. During this time ammonia is evolved. When ammonia is no longer given off, the melt is poured with stirring into about 200 parts of water. The product precipitates. It is extracted with benzene. The benzene layer is taken off, dried over sodium sulfate, and stripped free of solvent. A waxy solid remains, containing 7.6% of nitrogen. The theoretical nitrogen content for a compound of the empirical formula $C_{21}H_{42}N_2O_2$ is 7.9%. The compound is

*Example 13*

From 5-aminopentanol there is prepared by a conventional method with acetylene the ether,

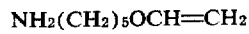

A mixture of 25.8 parts of this ether, 30 parts of urea, and one part of potassium cyanate is heated from 115° to 140° C. until evolution of ammonia ceases. The reaction mixture is poured into water and the resulting mixture is vigorously stirred to dissolve unreacted urea. The mixture is filtered and the product is recrystallized. It has a melting point of 103°–104° C. It contains 16.2% of nitrogen, corresponding closely to the amount of 16.3% calculated for the compound

The alkali metal cyanates form a class of preferred catalysts for the reaction by fusion with urea.

*Example 14*

In the same way 141 parts of 4-aminocyclohexyl vinyl ether is mixed with an excess of urea and the mixture is heated to 145° C. The product of fusion is extracted with water and recrystallized from an alcohol-water mixture. The nitrogen content of this material, 14.9%, agrees well with the theoretical value of 15.2% for the desired compound,

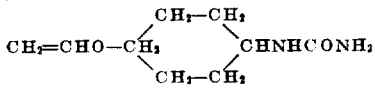

In place of the vinyl ethers of the above illustrative examples there may be reacted any of the aminoalkyl vinyl ethers of the formula

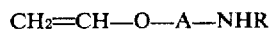

such as are shown above.

Ureidoalkyl vinyl ethers or N-vinyloxyalkylureas are reactive chamicals which are useful as chemical intermediates. They have two reactive centers, the unsaturated linkage and the ureido group, and can undergo reactions at either to form compounds useful in the fields of insecticides, fungicides, and pharmaceuticals. Ureidoalkyl vinyl ethers may be mixed with urea, melamine, and similar nitrogenous resin-forming materials and the mixture reacted with an aldehyde such as formaldehyde to yield resinous condensates which have advantages over straight urea-formaldehyde or melamine-formaldehyde resins, being modified by the presence of the ureidoalkyl vinyl ether. The ethers with relatively large hydrocarbon substituents provide an internal plasticizing action, while all of these ethers provide increased resistance to solvents and water for cured films or deposits of the resins made in this way.

The ureidoalkyl vinyl ethers can react with cellulose, polyvinyl alcohols, and other polyhydroxy compounds to give urea-modified materials which can be further reacted with formaldehyde. These ethers are thus useful in modifying cellulosic textile products and plastic materials. The vinoxyalkylureas having a large alkyl group can thus impart hydrophobic properties to materials otherwise sensitive to water. The long chained materials can be used for permanent waterproofing of cellulosic fibers and the like. These compounds also react with nitrogenous fibers.

The ureidoalkyl vinyl ethers containing hydrocarbon substituents of 8 to 18 carbon atoms have been found compatible with such vinyl resins as polyvinyl chloride. When added to these resins, as by milling, they impart a moderate degree of plasticization, but more particularly they stabilize the resin against degradation by actinic light.

Similarly substituted ethers have been found effective as corrosion inhibitors when dissolved in oils.

The lower members of the series exhibit insecticidal and ovicidal action. The water-soluble ethers possess an unusual capacity of solubilizing various organic compounds in aqueous solutions. From the fact that these ethers have been found free of toxic reactions in animals their use is indicated for solubilizing drugs in aqueous systems.

The ureidoalkyl vinyl ethers are characterized by good thermal stability and by little tendency to polymerize under normal storage conditions. Yet these ethers have a high degree of reactivity in the presence of azo catalysts.

In view of the teachings of the prior art with respect to the polymerization of alkyl vinyl ethers with the aid of acid catalysts and in view of the formation of polymers of a low degree of polymerization from allyl compounds and the resistance to polymerization of aminoalkyl vinyl ethers, it was an unexpected discovery that ureidoalkyl vinyl ethers can be polymerized under the influence of free radical catalysts of the azo type to yield high polymers in good conversion.

It has been found that ureidoalkyl vinyl ethers are polymerized in the presence of an acyclic azo compound. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis($\alpha,\gamma$-dimethylvaleronitrile), azobis($\alpha$-methylbutyronitrile), azobis($\alpha$-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

To effect polymerization a ureidoalkyl vinyl ether and an acyclic azo catalyst are mixed directly or in the presence of an inert solvent and the mixture is maintained between 60° and 100° C. until the desired extent of polymerization is attained. For water-soluble ureidoalkyl vinyl ethers water may serve as solvent, if desired. Other solvents include methanol, ethanol, isopropanol, butanol, dimethylformamide, benzene, toluene, ethyl acetate, etc. The amount of catalyst may be varied from about 0.1% to about 5% of the weight of the ureidoalkyl vinyl ether. The polymerization is best carried out in an inert atmosphere such as nitrogen gas.

For polymerization in solution concentrations of monomer from about 10% to about 60% are generally desirable. The course of polymerization may be readily followed from the increase in viscosity of the solution. The catalyst may be added by increments, if desired, with or without additional solvent.

A 50% aqueous solution of a water-soluble ureidoalkyl vinyl ether has a viscosity of less than $A_3$ on the Gardner-Holdt scale. After polymerization at 75° C. for 16 hours the viscosity is usually B to D, but may be carried to $Z_4$ as conversion is carried further.

Polymerization in dimethylformamide results in a conversion of monomer to polymer at least as high as in water and usually higher for a given amount of catalyst, but the polymer formed is of lower molecular size than polymers formed in water. For example, a 50% solution of ureidoethyl vinyl ether in dimethylformamide held at 75° C. for 16 hours readily develops a viscosity of G to I on the Gardner-Holdt scale, but conversion may be carried to a viscosity from D to $Z_4$. The polymer here is held in solution by the presence of monomer in the dimethylformamide, for after monomer and polymer are separated, the polymer does not redissolve in pure dimethylformamide.

For bulk polymerization the preferred temperatures are from about 70° to about 80° C. and the optimum proportion of catalyst is from 0.3% to 1% of the weight of the ureidoalkyl vinyl ether. Under a nitrogen atmosphere a satisfactory degree of polymerization is obtained in 10 to 20 hours.

The polymers which result are soluble substances. The polymers of ureidoethyl vinyl ether, ureidopropyl vinyl ether, N-methylureidoethyl vinyl ether, and N-methylureidopropyl vinyl ether are soluble in water and relatively insoluble in acetone, dimethylformamide, benzene, or ethoxyethoxyethanol. These polymers may be separated from their monomers by precipitation from their aqueous solutions, for example, by addition of a miscible solvent, such as acetone.

Polymers, precipitated as with acetone, are white to light tan solids which can be dried under reduced pressure. The dried polymers from ureidoethyl or ureidopropyl vinyl ethers are soluble in water. A 50% aqueous solution of such polymer has a viscosity of D to $Z_4$ on the Gardner-Holdt scale. If these polymers are heated above 150° C., they lose their solubility.

With increase in the size of the alkylene group A and of the group R in ethers of the formula

$$CH_2=CHOAN(R)CONH_2$$

A being an alkylene group of two to eighteen carbon atoms and R being hydrogen or a hydrocarbon group, preferably of not over ten carbon atoms, the polymers change from water-soluble to solvent-soluble. Thus with the $C_4$ alkylene group the polymer is soluble to some extent in hot water and soluble in alcohols or benzene. This change is also observed as the size of the R group increases above methyl.

The ureidoalkyl vinyl ethers polymerize through their vinyl groups to form polymers having a multiplicity of ureido groups available for further reaction. It is probably through these groups that the polymers become cross-linked and insoluble when they are heated above 150° C. These groups are also reactive to chemical reagents which combine with urea and like compounds, including aldehydes such as formaldehyde, ketones, isocyanates, isothiocyanates, and the like.

Typical procedures for forming polymers are shown in the following illustrative examples.

*Example 15*

A charge of 20 parts of ureidoethyl vinyl ether was placed in a vessel equipped for handling material under pressure. The charge was melted with heat from a steam bath and the apparatus was placed in an oven at 75° C. The apparatus was flushed with nitrogen and 0.2 part of dimethyl azodiisobutyrate was added thereto and mixed with the charge. The apparatus was sealed and held at 75° C. for 15 hours. It was then cooled. A nearly solid light-colored water-soluble product was obtained. The viscosity of a 50% aqueous solution was C on the Gardner-Holdt scale. It was essentially polyvinyl ureidoethyl ether.

Example 16

The pressure apparatus was charged with 20 parts of ureidoethyl vinyl ether and 2 parts of urea. This mixture was melted at 75° C., the apparatus was flushed with nitrogen, and a portion of 0.2 part of azodiisobutyronitrile was added and mixed with the charge. The apparatus was sealed and maintained at 65° C. for 16 hours. The product was viscous, light-colored, and water-soluble and was a solution of polymer (50%) in monomer. The polymer was precipitated from an aqueous solution upon addition of acetone.

Example 17

The pressure apparatus was charged with 20 parts of ureidoethyl vinyl ether, 20 parts of distilled water, and 0.1 part of dimethyl azodiisobutyrate, flushed with nitrogen, sealed, and heated for 72 hours at 75° C. The apparatus was cooled and opened. There was obtained a solution having a viscosity of F—. Addition of acetone caused precipitation of a light tan polymeric solid, which was soluble in water.

Example 18

The pressure apparatus was charged with 20 parts of ureidoethyl vinyl ether, 20 parts of dimethylformamide, and 0.2 part of dimethyl azodiisobutyrate, flushed with nitrogen, sealed, and heated at 75° C. for 50 hours. When the apparatus was cooled, a solution of polymer in a mixture of monomer and dimethylformamide was obtained having a viscosity of I— on the Gardner-Holdt scale. The polymer was precipitated by taking up the above solution in water and adding acetone thereto. A white solid resulted when the polymer was dried.

The above procedure was repeated with a charge of 20 parts of purified ureidoethyl vinyl ether, 20 parts of dimethylformamide, and 0.3 part of dimethyl azodiisobutyrate. The resulting solution of polymer had a viscosity of Z-4 on the Gardner-Holdt scale. A 94% yield of polymer was obtained. It was insoluble in acetone. This polymer had a molecular weight in excess of 15,000 (by osmotic pressure). With variations in solvent still higher molecular weights can be obtained.

In contrast to the above preparation an attempt was made to polymerize butyl vinyl ether with the same catalyst. Even with variation of catalyst up to 10% of the weight of this ether conversions to low molecular weight polymers did not exceed one per cent. These results demonstrate the amazing influence of the ureido group.

Example 19

A reaction vessel was charged with 100 parts by weight of ureidoethyl vinyl ether, stirred, and heated under a nitrogen atmosphere to 75° C. There was added 1 part by weight of dimethyl azodiisobutyrate. Within 15 minutes there occurred an exothermic reaction which was easily controlled. The mixture was stirred and heated for 16 hours. The reaction mixture was then taken up in 100 parts by weight of water. The viscosity of the resulting solution was C—. To this solution was added one part of dimethyl azodiisobutyrate. The solution was heated at 75° C. for 16 hours. Its viscosity was then G. The solution was further heated at 75° C. for 8 hours. The viscosity was then I. The solution was poured into acetone. A viscous gum precipitated. The precipitate was extracted with acetone and dried in vacuo to yield 54 parts of a light tan solid.

From the mother liquors and washing liquors there was recovered ureidoethyl vinyl ether in an amount of 37.5 parts. This was recrystallized from ethylene dichloride. A part of this recovered monomer was treated with dimethyl azodiisobutyrate at 75° C. Polymer was obtained as above.

Example 20

A reaction vessel is charged with 100 parts by weight of pure ureidoethyl vinyl ether and 100 parts of water. The solution is adjusted to pH 7.0 and heated under a nitrogen atmosphere to 75° C. There is added 1.5 parts by weight of dimethyl azodiisobutyrate and the mixture is stirred and maintained at 75°±5° C. by judicious cooling or heating of the mixture until the initial exothermic reaction is complete, a matter of 1 to 1.5 hours. The reaction is then heated under nitrogen at 75° C. for a total of 16 hours. The viscosity is U on the Gardner-Holdt scale. Precipitation with acetone and vacuum drying at 60° C. gives 80 g. of a fine, white hygroscopic powder soluble readily (50% or more) in water but insoluble in all other common organic solvents except perhaps monomer and solutions thereof. It is soluble in formic acid and hot m-cresol with some apparent degradation.

This unusual material represents a readily obtainable, water-soluble high polymer of easily variable and reproducible molecular weight. It is useful as an intermediate in the preparation and modification of a large number of resinous materials as, for example, in the modification of aqueous melamine-formaldehyde or urea-formaldehyde condensates. It is extremely hygroscopic but controllably so, giving solutions of 50–75% solids. In this way it is of value as a humectant and may be incorporated into aqueous based inks for stamping and printing to impart smooth and uniform consistency with long operational life. Aqueous solutions of the polymer have high viscosities and the polymer is useful as a replacement in emollients and emulsions for gum thickeners such as tragacanth and acacia but free from the undesirable sensitivity of the natural gums to bacterial and fungal attack. The polymers are of such molecular size and solubility that they are suggested for use as partial plasma replacements in blood loss. Toxicity data indicate a low degree of toxicity.

Of particular interest is the use of this and related water-soluble ureidoalkyl vinyl ether polymers in the modification of paper and textiles. Polyureidoethyl vinyl ether when applied to unbleached kraft stock in the beater at 2% resin at pH 4.0 and the formed sheet dried at 100° C. for 10 minutes gives 10.7 pounds of wet strength and 29.3 pounds of dry strength compared to 0.2 pound and 19.0 pounds for an untreated control. The importance of this observation is the fact that retention in the beater and wet strength have both been obtained without the use of formaldehyde or similar materials. This represents the first example of such a material which can be applied under a wide range of pH conditions in the beater at low concentration to give wet strength without formaldehyde. The advantages are several. The polymers are storage stable and very easy to apply; there is no danger of gelation due to premature condensation in storage or during application. The treated papers are free of formaldehyde and are of particular advantage in the manufacture of photographic paper where the reducing action of formaldehyde is undesirable.

In the textile field this polymer and related water-soluble polymers find use in several ways. These polymers are useful as warp sizes in the weaving of cotton, rayon and synthetic fabrics. The polymers may be readily removed after weaving by water scour or may be permanently set by a brief heating of the finished material at 100°–150° C. to impart water-resistant stiffening to the fabric. These polymers when added to an aqueous spinning medium, such as viscose, may be incorporated into the regenerated fiber where they resist removal by the regenerating solvent since they are too large to diffuse through the essentially semi-permeable membrane that is the fiber. Such fibers show changed physical properties but are most useful when treated by heating to 100°–150° C. to insolubilize and cross-link these internal high polymers. The resultant fibers then become crease-proof, show a marked decrease in swelling in solvents and no significant loss in tensile strength or resistance to tear.

A unique and special application is the formation of these polymers within cellular materials such as cotton, leather, and the like. Previous attempts to obtain these results with condensation type materials, such as urea-formaldehyde, were difficult to control since the resinous materials were either not large enough to resist diffusion or else were so big that surface resin could not be removed, resulting in stiffening and other undesirable properties. Vinyl monomers suggested for this purpose have been largely water-insoluble so that penetration into the cellular component is difficult and those that are soluble give insoluble polymers, again difficult to separate from surface resin.

Polymers may be formed in situ. Thus, ureidoethyl vinyl ether may be applied to cellulose from a water solution and polymerized within the cellulose, as in the following example.

*Example 21*

A sample of cotton fabric is immersed in a 50% aqueous solution of ureidoethyl vinyl ether containing 1.5% by weight of dimethyl azodiisobutyrate and allowed to become saturated with the solution. The mixture is heated in an inert atmosphere at 75° for 16 hours. The fabric is then scoured and dried at 240° F. for 10 minutes. The fabric is divided in half; one part is retained as a control and the other treated with formaldehyde and an acid catalyst and dried. The results tabulated below show the resulting increase in crease recovery and indicate the per cent of resin retained in the fiber.

| Treatment | Crease Recovery [1] | Percent Resin in Fiber |
|---|---|---|
| None | 63 | 0 |
| Polymer | 69 | 5 |
| Catalyst and Aldehyde | 63 | 0 |
| Polymer, Aldehyde, and Catalyst | 119 | 4 |

[1] Shirley Institute test.

This crease recovery is not lost by subsequent washing of the fabric.

*Example 22*

A solution of 20 parts of β-ureidoisobutyl vinyl ether in 20 parts of dimethylformamide was placed in a pressure vessel. Air was displaced with nitrogen and 0.2 part of dimethyl azodiisobutyrate was added. The vessel was sealed and heated at 75° C. for 16 hours. The vessel was cooled and the contents thereof, a clear syrup, were poured into 80 parts by weight of acetone. The polymer precipitated. It was separated and dried at 60° C. under reduced pressure. The yield was 10.5 parts of a powdery, white solid which was soluble in methanol and butanol but was insoluble in water. The monomer was recovered from the acetone solution. Since this polymer was soluble in organic solvents used in coatings, it may be admixed with such coating materials as alkyd resins and applied in solvent solutions. The resulting coatings, after they have been baked, become very resistant to organic solvents.

*Example 23*

Ten parts of 1-ureido-2-vinoxyoctadecane is heated to 75° C. and the clear melt is treated with 0.2 part of dimethyl azodiisobutyrate. The resulting mixture is heated at 75° C. under nitrogen for 16 hours to give a very viscous mass that is purified by extraction with hot ethanol to give a waxy polymer, melting over a range 100°–130° C.

A solution of this polymer in toluene is applied to cotton fabric and dried at 120° C. for 10 minutes to give a wash fast, water-repellent material. The polymer is soluble in lube oils. When added in small amounts, 0.1–1%, to Pennsylvania Bright Stock it decreases the pour point. The corresponding dodecane polymer is compatible with polyvinyl chloride resins and when used together with a primary plasticizer, such as dioctyl sebacate, in the formation of vinyl sheet the resistance of the sheet to deterioration by light is improved.

*Example 24*

There are mixed 0.1 part of dimethyl azodiisobutyrate and 10 parts of 8-vinoxy-2,6-dimethyl-2-ureidooctane. The mixture is blanketed under nitrogen and heated to 70°–80° C. A plastic polymeric product is formed which remains soluble in toluene. When the polymer is heated at 150° C., it becomes insoluble.

In the same way there may be polymerized such compounds as N-benzyl-N-vinoxyethylurea, 4-ureido-4-methyl-2-pentyl vinyl ether, 3-ureido-3-phenylbutyl vinyl ether, 1-phenyl-2-ureidoethyl vinyl ether, 5-ureidopentyl vinyl ether, and the like.

*Example 25*

A mixture of 20 parts of 2-ureidopropyl vinyl ether, 20 parts of water, and 0.3 part of dimethyl azodiisobutyrate is heated under nitrogen at 75° C. for 19 hours. The conversion to polymer is 75%. The polymer is precipitated with acetone as a white powder. An aqueous 50% solution of this polymer has a Gardner-Holdt viscosity of U.

*Example 26*

There are mixed 20 parts of 5-ureidopentyl vinyl ether, 20 parts of dimethylformamide, and 0.3 part of diethyl azodiisobutyrate. The mixture is heated under nitrogen at 75° C. for 20 hours with a conversion to polymer of 50%. The polymer is insoluble in acetone, but is soluble in ethanol and butanol. Films formed from the solution are hard and brittle. The polymer is useful for mixing with solvent-soluble alkyds. It is also of interest for reacting with formaldehyde to form the methylol derivative which is in turn reacted with an alcohol, such as isopropanol or butanol, under acid conditions to form the alkoxymethyl derivative, which is useful in coating compositions.

The above polymer is of considerable theoretical interest in showing that the influence of the ureido group is exerted even though it is removed by five carbon atoms from the vinyl group. The ureido group still activates the vinyl group so that it is polymerized under the influence of azo catalysts.

*Example 27*

A charge of 20 parts of N-cyclohexyl-N-vinyloxyethylurea is heated to 75° C. under nitrogen and treated with 0.2 part of dimethyl azodiisobutyrate. The resulting mixture is heated for 20 hours at 75° C. with a 50% conversion to polymer. The polymer is a white solid soluble in alcohols and toluene, but insoluble in acetone. When a solution in butyl alcohol is applied to glass and metal plates and the coatings are dried, hard, glossy, highly adhesive films are obtained. The polymers may be coreacted with alkylated urea- or melamine-formaldehyde condensates or the alkoxymethyl derivatives of the polymers may be so reacted. They may also be combined with acrylic or methacrylic esters to give useful coatings which can be hardened by baking.

*Example 28*

In the same way as shown in Examples 17 and 18 N-methyl-N-vinyloxyethylurea is polymerized in water or in dimethylformamide. Conversion in 16 hours is 50% to 75%. The polymer is soluble in water but can be precipitated with acetone. It is soluble also in lower alcohols. This polymer is useful for preparing wet-strength resins for paper. It yields solvent-soluble alkoxymethyl derivatives which are useful in coatings. It may be coreacted with urea or melamine and formaldehyde to form nitrogenous resins.

Example 29

As in Example 15 N-nonyl-N-vinyloxyethylurea is heated with dimethyl azodiisobutyrate. The resulting polymer is soluble in methanol, acetone, petroleum ether, benzene, and oils.

Example 30

A mixture of 10 parts of N-C$_{18}$H$_{33}$-N-vinyloxyethylurea (the C$_{18}$H$_{33}$ group being derived from soya oil), 10 parts of dimethylformamide, and 0.2 part of dimethyl azodiisobutyrate is heated at 70°–75° C. for 15 hours. There results an oily solution of polymer. When this is treated with a cobalt soap and applied to metal, air-drying films are obtained which are highly resistant to organic solvents.

From N-allyl-N-vinyloxyethylurea gels are usually obtained on polymerization. On the other hand the crotonyl analogue,

$$CH_3CH=CHCH_2-N(CONH_2)CH_2CH_2OCH=CH_2$$

or cyclohexenyl, oleyl, or methylethynyl analogues give soluble polymers.

The polymers of this invention are useful in the fields of paper, coatings, and textiles. The water-dispersible types can be incorporated in viscose dopes to impart insolubility of the final films or fibers. The solvent-soluble types can be incorporated in cellulose acetate dopes to improve the properties of fibers and films therefrom. The polymers themselves can be used to give coatings on paper, for example. They can be applied to textile fibers as finishing agents. When the polymers are heated they become cross-linked and insoluble. They also react with cellulose, wool, silk, and the like. When large substituents are present, the treated substances become water repellent.

The polymers may likewise be mixed with other coating materials. When the films formed from the mixture are heated, cross-linking coupled with solvent resistance is obtained.

The polymers react with formaldehyde to form interesting and novel methylol derivatives. These are soluble, reactive condensates which are rendered insoluble when heated. The water-soluble condensates are particularly useful for imparting wet strength to paper. They are useful for bonding rubber to fabric, including tire cord. They are useful for stabilizing wool. These hydroxymethyl compounds can be reacted with alcohols to yield ether derivatives, the simple alcohols yielding the corresponding alkoxymethyl derivatives. These are particularly useful in coating compositions.

The polymers of this invention are classed as high polymers since the polymers are built up of a large number of repeating units. Yet it must be pointed out that the degree of polymerization can readily be controlled by choice of solvent and other conditions of polymerization. In bulb polymerizations or in polymerizations in aqueous solutions polymers of 50,000 to 200,000 molecular weight are readily obtained. In many organic solvents, such as dimethylformamide, alcohols, and ethyl acetate molecular weights can be obtained of the order of 10,000 to 20,000.

In contrast to alkyl vinyl ethers which copolymerize under the influence of organic peroxides but poorly and in some cases fail to enter into copolymers, the ureidoalkyl vinyl ethers have been found widely useful in co-polymerizations. It has been found that ureidoalkyl vinyl ethers can be copolymerized with other polymerizable olefinically unsaturated compounds, particularly vinylidene compounds, under the influence of a polymerization promoter of the free radical type, such as peroxides or azo catalysts, an acylic azo compound being particularly useful and advantageous. With an azo catalyst temperatures between 50° and about 100° C. are generally effective for copolymerizing. Somewhat higher temperatures are useful when catalysts of the peroxidic type are used, temperatures between 75° and 150° C. being practical, the above temperatures being those observed for copolymerization in bulk or in solution. Temperatures between 0° and 100° C. or more are useful when copolymerization is carried out in aqueous suspensions or in emulsions.

The same azo catalysts described above for use in forming polymers are used for preparing copolymers, particularly when the major portion of the monomers is a ureidoalkyl vinyl ether. The amount of catalyst may be varied between 0.1% and 5% of the weight of the monomers to be copolymerized. A range from 0.3% to 1% is preferred, at least at the start. Small amounts of catalyst may be added from time to time as copolymerization proceeds.

When a ureidoalkyl vinyl ether furnishes the minor portion of an interpolymer, however, other free radical catalysts may prove desirable. For example, organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming the copolymers there may be used acrylic acid, methacrylic acid, esters of acrylic acid or methacrylic acid and monohydric alcohols such as methyl, ethyl, butyl, octyl, dodecyl, cyclohexyl, allyl, methallyl, undecenyl, cyanoethyl, aminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, 2-vinylpyridine, 4-vinylpyridine, or divinylbenzene; ethylene diacrylate or dimethacrylate, bis(vinoxyethyl)urea, vinoxyethyl acrylate, vinoxypropyl acrylate, etc. Where two polymerizable vinylidene groups occur in the same molecule, as in compounds toward the end of the above list, crosslinking results where more than one to two per cent thereof is used in forming the copolymer.

A ureidoalkyl vinyl ether and other polymerizable vinylidene compound can be mixed in a wide range of proportions and copolymer formed from the mixture. Again, a ureiodoalkyl vinyl ether may be mixed with two or more other polymerizable vinylidene compounds and interpolymers formed therefrom over a wide range of proportions.

There are several important types of classes of interpolymers which should be particularly mentioned. Where it is desired to obtain new properties or variations in properties over the properties of the homopolymer of a ureidoalkyl vinyl ether there may be used about 1% to about 60% of one or more other polymerizable vinylidene compounds. Often 1% to 20% is the most useful range to promote the desired modification of properties. Some valuable examples of copolymers of this sort are those obtained with 1% to 20% of vinylpyridine and 99% to 80% of a water-soluble ureidoalkyl vinyl ether. These copolymers have marked affinity for cellulose. Again a copolymer from 1% to 20% of acrylic acid, itaconic acid, or methacrylic acid and 99% to 80% of a water-soluble ureidoalkyl vinyl ether is of interest because it supplies properties peculiar to polymers of the ureidoalkyl vinyl ether and yet it can be cured or insolubilized by treatment with polyvalent metal ions, such as aluminium or calcium.

In another important category of interpolymers a ureidoalkyl vinyl ether is incorporated in minor amount with another polymerizable vinylidene compound to impart new properties thereto. Here 1% to 50% and preferably 1% to 20% of ureidoalkyl vinyl ether is mixed with one or more other polymerizable vinylidene compounds and the interpolymer thereof is formed. The presence of groups from the said ether imparts a second stage reactivity to the interpolymers. The presence of such groups may impart such desired properties as solvent-resistance, craze-resistance, hydrophilic properties (from ethers with small alkyl groups), hydrophobic properties (from ethers with larger alkyl groups), thermal activity, reactivity toward such substances as aldehydes, and so on. The ureidoalkyl vinyl ethers may thus be used to modify copolymers for use in coatings, adhesives, films, fibers, castings, etc.

Copolymerization, as has been indicated, may be effected in bulk, in solution, or in dispersion. When the monomers to be copolymerized are water-soluble, they may be copolymerized in aqueous solutions. Solvent-soluble monomers may be handled in inert organic solvents such as benzene, toluene, methanol, ethanol, butanol, acetone, methyl ethyl ketone, dimethylformamide, ethyl acetate, ethylene dichloride, etc. Concentrations from about 10% to 60% are conveniently used. The course of copolymerization may be followed from the changes in viscosity or changes in solubility. Monomers and copolymer may be separated, if desired, by precipitation, extraction, distillation, or other conventional step.

Water-soluble ureidoalkyl vinyl ethers effectively solubilize considerable proportions of otherwise water-insoluble polymers or vinylidene compounds, such as methyl acrylate, methyl methacrylate, vinyl acetate, acrylonitrile, or vinylpyridine. For example, a copolymer from two parts of ureidoethyl vinyl ether and one part of methyl acrylate, or methyl methacylate, or vinyl acetate is soluble in water even though homopolymers of the latter are not.

Polymerization may also be carried out by techniques useful for forming copolymers in dispersion in aqueous systems. Here a mixture of ureidoalkyl vinyl ether and another polymerizable vinylidene compound without or with an organic solvent is dispersed or suspended in water. An emulsifier and/or dispersing agent may be used. The mixture is usually stirred. A polymerization catalyst is added, or catalyst and activator and, if desired, modifiers, such as buffers, metal ions, mercaptans, and the like. Ordinarily dispersions containing 10% to 60% of polymerizable materials are used. Temperatures from below 0° C. to about 100° C. may be used. The preferred temperature range is 15° to 60° C.

In bulk interpolymerizations a ureidoalkyl vinyl ether is mixed with one or more other polymerizable vinylidene compound and a polymerization catalyst is added. The mixture is maintained at a temperature at which the catalyst is effective for promoting polymerization until reaction is essentially complete. The copolymerization is best carried out under an inert atmosphere.

Typical copolymerizations are described in the following examples. Parts are by weight.

*Example 31*

A mixture of 10 parts of vinoxyethanol, 10 parts of ureidoethyl vinyl ether, and 0.2 part of dimethyl azodiisobutyrate was placed in a pressure vessel. The vessel was flushed with nitrogen, sealed, and heated at 75° C. for 16 hours. The polymer which resulted was taken up in 30 parts of water and the resulting solution was poured into 200 parts of acetone. A precipitate of copolymer formed. It was filtered off and redissolved. The solution thereof was reprecipitated with acetone. The purified copolymer was dried and analyzed for nitrogen. From the nitrogen content of 10.4% it is calculated that the copolymer was formed from 1.6 moles of vinoxyethanol per mole of ureidoethyl vinyl ether.

*Example 32*

A mixture of 15 parts of vinoxyethanol, 15 parts of ureidoethyl vinyl ether, 30 parts of water, and 0.3 part of azodiisobutyronitrile was placed in a pressure vessel. The vessel was flushed with nitrogen, sealed, and heated at 60° C. for 48 hours. From time to time catalyst was added in amounts totaling 0.5 part. The resulting copolymer was precipitated by addition of acetone. The dried copolymer contained by analysis 9.8% of nitrogen, thus corresponding to a product from 1.8 moles of vinoxyethanol per mole of ureidoethyl vinyl ether.

*Example 33*

(a) A mixture of 10 parts of vinyl acetate, 30 parts of ureidoethyl vinyl ether, and 0.01 part of dimethyl azodiisobutyrate was copolymerized at 75° C. under nitrogen for two hours. A rubbery reaction product resulted. It was extracted with hot acetone and then with hot water. Polyvinyl acetate is soluble in acetone and insoluble in water. Polyvinyloxyethylurea is water-soluble and insoluble in acetone. The product was found to contain one molecular unit from vinyl acetate for each molecular unit of ureidoethyl vinyl ether.

(b) The above procedure was followed with a mixture of 20 parts of vinyl acetate, 20 parts of ureidoethyl vinyl ether, and 0.01 part of dimethyl azodiisobutyrate. The final product contained 2.88 moles of vinyl acetate per mole of the ether.

(c) The above procedure was repeated with 30 parts of vinyl acetate, 10 parts of ureidoethyl vinyl ether, and 0.01 part of dimethyl azodiisobutyrate. The final product contained 6.24 units of the acetate per mole of the ether.

*Example 34*

A pressure vessel was charged with 15 parts of vinyl acetate, 15 parts of ureidoethyl vinyl ether, 30 parts of water, and 0.2 parts of azodiisobutyronitrile, flushed with nitrogen, sealed, and heated to 55° C. Copolymerization began and carried the temperature to 68° C. The vessel was then maintained at 55° C. for 16 hours and cooled. Solution was decanted from rubbery copolymer. The copolymer was extracted twice with hot water. The copolymer was dried to yield a horn-like resin, containing 5.3% of nitrogen. On this basis the copolymer was composed of 4.6 units of vinyl acetate per unit of ureidoethyl vinyl ether.

*Example 35*

A mixture of 15 parts of methyl acrylate, 5 parts of ureidoethyl vinyl ether, and 0.05 part of dimethyl azodiisobutyrate was heated under nitrogen for 16 hours at 75° C. The resulting resin was extracted with hot toluene and hot water. The dried copolymer contained 4.5% of nitrogen. This indicates a copolymer from 5.7 units of methyl acrylate per unit of the ether.

*Example 36*

A mixture of 30 parts of ureidoethyl vinyl ether, 15 parts of methyl acrylate, 45 parts of water, and 0.1 part of azodiisobutyronitrile was copolymerized by the procedure of Example 34. The product was extracted with hot water, toluene, and methanol. The dry, brittle solid contained 13.5% of nitrogen. This indicates a ratio of methyl acrylate units to ether units of 0.9:1.

*Example 37*

By the same procedure a mixture of 15 parts of acrylonitrile, 30 parts of ureidoethyl vinyl ether, 45 parts of distilled water, and 0.2 part of axodiisobutyronitrile was stirred and heated under nitrogen at a temperature of 55° C. for 18 hours. A white, rubbery copolymer formed. It was washed with hot water and dried to give 36.5 parts of a copolymer containing 22.5% of nitrogen.

A similar preparation was carried out in which dimethyl formamide was used as the solvent. The copolymer obtained was tough and rubbery.

Example 38

(a) In the same way as shown in Example 31 copolymers were prepared with ureidoethyl vinyl ether and acrylic acid. In a series of preparations these monomers were mixed in mole ratios of 97.5:2.5, 95:5, 90:10, and 80:20. Azodiisobutyronitrile was used as the catalyst at 0.5% and temperatures during copolymerization were held at 65°–70° C. The copolymers made with the first two mole ratios were soluble in water and those from the latter two were soluble in wet acetone. In general the composition of each of the copolymers paralleled the proportions of monomers mixed in each case.

(b) The procedure of (a) is followed with mixtures with mole proportions of 2.5:97.5, 5:95, 10:90, and 20:80 of acrylic acid and ureidoethyl vinyl ether with 0.5% of dimethyl azodiisobutyrate being used as the catalyst. All of the copolymers thus obtained are soluble in water.

The above water-soluble copolymers are suitable for addition to the wet end of the paper making machine for the purpose of improving the properties of paper. Addition of a solution of one of the above copolymers is desirably made to the beater and thereafter addition of alum is made. The sheets made from the thus treated pulp possess greatly increased wet strength.

An even better improvement in wet strength of paper is obtained by first treating the above copolymers with formaldehyde and then adding the methylol derivatives to the beater and then treating with alum.

Example 39

Copolymers were prepared at 65°–75° C. as above from mixtures of vinylpyridine and ureidoethyl vinyl ether in water and also in dimethylformamide. Mole ratios of 2.5:97.5, 5:95, 10:90, and 20:80 of the two components were used in each of the solvents. Conversions to copolymers were 86 to 96% in dimethylformamide with 1.6% of dimethyl azodiisobutyronitrile as catalyst. Conversions in water were lower. The resulting copolymers vary in water solubility. They react with formaldehyde to give interesting new methylol derivatives which are peculiarly effective for imparting wet strength to paper.

The copolymers of vinylpyridine and ureidoethyl vinyl ether have many properties common to copolymers of this invention, but they also have some very unusual properties, particularly as applied to the problem of wet strength.

Example 40

A mixture of 20 parts of ureidoethyl vinyl ether and 20 parts of aminoethyl vinyl ether was treated with 0.1 part of dimethyl azodiisobutyrate and heated at 75° C. for five hours. The resulting copolymer was of especial interest because it contained basic groups. It reacted with an alkaline formaldehyde solution to give an insoluble gel, which was solubilized upon careful addition of acid. But at a pH value of 4 and below, the copolymer became insoluble, forming an irreversible gel.

The copolymers from ureidoethyl vinyl ether and amino-ethyl vinyl ether are horny products which have great affinity for glass.

Example 41

A mixture of ethyl acrylate and ureidoethyl vinyl ether in a 95:5 mole ratio was copolymerized in emulsion form with 1% of potassium persulfate as catalyst. Catalysts of this type are effective where the ureidoalkyl vinyl ether constitutes less than 20 mole per cent of the mixture to be copolymerized. This is also true for copolymerizations in solution.

Example 42

A mixture of ureidoethyl vinyl ether and bis (vinyloxyethyl) urea in which the latter was present to the extent of 1.4 mole per cent was polymerized at 68° C. for eight hours, the catalyst being dimethyl azodiisobutyrate at 0.6%. The resulting copolymer was water-soluble.

Above 1.5 mole per cent of bis (vinyloxyethyl) urea, however, the copolymers which are formed tend to become insoluble. Thus a mixture of these two monomers in a 98:2 mole ratio gives a copolymer, 30% of the copolymer formed being insoluble in water and organic solvents and having the physical form of a gel.

Substitution of divinylbenzene for the bis (vinyloxyethyl) urea gives a very similar result, the polyfunctional vinylidene compound serving to cross-link the copolymer.

Example 43

There are charged to a reaction vessel 77.4 parts of methyl acrylate, 13 parts of ureidoethyl vinyl ether, and 100 parts of dimethylformamide. The mixture is stirred and the vessel is flushed with nitrogen. Thereto is added 0.2 part of dimethyl azodiisobutyrate and the charge is heated with stirring at 75° C. for 12 hours under nitrogen. The reaction mixture is then cooled and poured into water. The copolymer separates as a tough, rubbery material in a yield of about 80%. This copolymer, based on 10 mole per cent of ureidoethyl vinyl ether and 90 mole per cent of methyl acrylate, is soluble in acetone, benzene, and dimethylformamide, but is insoluble in methanol, ethanol, and water.

A portion of the copolymer is dissolved in acetone and the solution is flowed over a plate. The resulting film is allowed to dry at 60° C. and yields a soft, rubbery, solvent-soluble film. A film of this copolymer is heated at 180° C. for an hour. Another film is heated at 200° C. for about thirty minutes. These two films are tough, hard, and insoluble. It is evident that cross-linking has occurred during heating, probably through loss of ammonia with formation of reactive groups.

A solution of the copolymer is treated with formaldehyde in butanol and a trace of butyl acid phthalate. Films are formed from the resulting solution. One is heated at 125° C. for thirty minutes and one at 100° C. for 60 minutes. Clear, tough, flexible films result which are insoluble in acetone or toluene.

The above solution formed with formaldehyde is treated with sufficient butyl acid phthalate to bring the acid content to 4% based on resin solids in this solution. Films are formed from this solution. They are left standing at room temperature. Within four hours the films became insoluble in the usual organic solvents, including benzene, toluene, and acetone.

In the same way other copolymers based on one to twenty mole per cent of ureidoethyl vinyl ether and 99% to 80% of methyl acrylate, ethyl acrylate, butyl acrylate, methyl methacrylate, butyl methacrylate, or other alkyl acrylate or methacrylate can be formed with the aid of 0.1% to 1% of an azo catalyst at preferably 50° to 80° C. or with a similar amount of a peroxidic catalyst such as benzoyl peroxide, ethyl or butyl perbenzoate, or other active peroxide at temperatures between 70° and 115° C.

Mixtures of acrylic or methacrylic esters, such as methyl acrylate and hexyl acrylate, may be interpolymerized with a ureidoalkyl vinyl ether by the same sort of procedure to give terpolymers of widely varying properties. Yet because of the ureidoalkyl groups therein these terpolymers can be reacted with an active aldehyde, such as formaldehyde, furfuraldehyde, benzaldehyde, or nonylaldehyde, and the methylol derivatives caused to cross-link and give insoluble products. Thermoset, cross-linked products are also obtained when the terpolymers are heated between 100° and 200° C.

Example 44

There are mixed 950 parts of ethyl acrylate, 65 parts of ureidoethyl vinyl ether, 1530 parts of toluene, and 2.4 parts of benzoyl peroxide. The mixture is heated to above 100° C. At about 110° C. an exothermic reaction sets in with refluxing for a short time of the solvent to remove the heat. The mixture is stirred and maintained at 95°–100° C. for two hours, at which time a solution of one part of benzoyl peroxide in 40 parts of toluene is added. The temperature is maintained near 100° C. At the end of another hour another part of benzoyl peroxide in 40 parts of toluene is added. There is thus produced a clear, light yellow solution containing 40.7% of copolymer and having a viscosity of Y+ (Gardner-Holdt).

A film formed from this solution on glass when baked at 150° C. for 30 minutes becomes tack-free, but is soluble in ethoxyethyl acetate. When, however, the solution of copolymer is treated with 20% of its weight of formaldehyde in butanol and 1% of butyl acid phthalate is added, the resulting films remain tack-free and flexible, but become completely resistant to ethoxyethyl acetate.

*Example 45*

There are mixed 171 parts of ethyl acrylate, 209 parts of methyl methacrylate, 30.8 parts of ureidoisobutyl vinyl ether, 250 parts of ethoxyethyl acetate, and one part of benzoyl peroxide. This mixture is slowly added with stirring to 250 parts of ethoxyethyl acetate which is heated to 100° C. Stirring and heating are continued. After two hours addition is made of 0.4 part of benzoyl peroxide in 60 parts of the acetate solvent. This same addition is made at the end of three hours. Heating is discontinued after four hours. The product is a viscous, colorless solution containing 39.7% of copolymer and having a viscosity of Y. The conversion is over 98%. Films from this solution are hard, clear, glossy, and flexible, but are not resistant to ethoxyethyl acetate. When, however, the copolymer is treated with solution of formaldehyde in butanol and butyl acid phthalate, as above, the films are still flexible and glossy, but are now resistant to ethoxyethyl acetate. Hardness of these films is 4H (Kohinoor pencil scale).

*Example 46*

There are mixed 380 parts of methyl methacrylate, 26 parts of ureidoethyl vinyl ether, 250 parts of ethoxyethyl acetate, and 4 parts of azodiisobutyronitrile. This mixture is slowly added to 250 parts of ethoxyethyl acetate which is stirred and heated at 75° C. Stirring and heating at about 75° C. are continued. After two hours a solution of 0.25 parts of azodiisobutyronitrile in 60 parts of ethoxyethyl acetate is added and again at the end of three hours. Heating was discontinued at 3.5 hours. There is thus obtained a clear, colorless solution containing 38% of copolymer and having a viscosity of Y–. Films are formed on metal and glass. These have good hardness (4H), good flexibility, and fairly good adhesion.

When the copolymer is treated as above with formaldehyde in butanol and butyl acid phthalate, films of extreme hardness (6H to 7H) are obtained. Adhesion is improved with retention of excellent color, gloss, and flexibility. These films remain unaffected by ethoxyethyl acetate even when soaked therein for 24 hours.

Comparison of the above copolymer was made with one in which ten mole per cent of allylurea was substituted for the five mole per cent of ureidoethyl vinyl ether above. There was obtained a solution containing 38.9% solids and having a viscosity of V. The polymeric material therein was precipitated with methanol. It contained one mole per cent of allylurea or at most 10% of that charged. Films of this copolymer, even when baked with formaldehyde and acid, were completely lifted by ethoxyethyl acetate within 15 minutes.

The copolymers prepared in the last three examples may be precipitated with petroleum ether to give solid copolymers which range in melting point from 20° (for the ethyl acrylate copolymer) to 100° C. (for the methyl methacrylate copolymer). These solids are useful as molding powders to give hard, clear products. The powders of the above copolymers may be modified with 5% to 20% of urea-formaldehyde or melamine-formaldehyde molding powders and an acid catalyst to give solvent-resistant and craze-resistant moldings. Pulp fibers and fillers may be incorporated for increasing shock resistance.

The copolymers of the softer acrylates and long-chained alkyl methacrylates as well as those derived from vinyl acetate or propionate, also copolymers based in part on acrylonitrile can be prepared in solvent, then freed of solvent, and milled to give rubbery products suitable for use where oils or solvents are involved. These copolymers may be loaded, as with carbon black on a mill, to improve strength properties. From 2 to 15 mole per cent of a ureidoalkyl vinyl ether may be copolymerized with an acrylic ester to give flexible rubbery products, while proportions up to 70% may be used with acrylonitrile or interpolymers based in considerable measure on acrylonitrile. With vinyl acetate a third monomer or additional monomers, such as ethyl or butyl acrylate or octyl methacrylate, is needed to supply good flexibility.

*Example 47*

(a) A mixture of 95 parts of ethyl acrylate, 6.5 parts of ureidoethyl vinyl ether, and 200 parts of water is emulsified at 25° C. with the aid of four parts of a mild soap. Thereto are added 0.3 part of potassium persulfate and 0.1 part of morpholine. The mixture is cooled to 15° C., blanketed under nitrogen, and stirred. A slow exothermic reaction takes place and cooling is supplied to maintain the temperature at about 15° C. There is thus formed a dispersion of a copolymer.

When this emulsion is deposited as a film on a glass plate or steel panel and the film is dried, there is obtained a soft, rubbery, solvent-soluble film. The film becomes insoluble when heated between 125° and 200° C. for times up to 48 hours.

A portion of the emulsion is mixed with formaldehyde. The films from this mixture become insoluble when treated with acid or after they are baked at 100° C. The resultant films are tough and solvent-resistant.

(b) A mixture is prepared from 77.4 parts of methyl acrylate, 13 parts of ureidoethyl vinyl ether, 200 parts of water, 5 parts of a rosin soap, 0.05 part of potassium hydroxide, 0.2 part of potassium chloride, 0.12 part of ferrous sulfate heptahydrate, 0.2 part of cumene peroxide, 0.03 part of sodium hydroslulfite and 0.015 part of sodium silicate. This mixture is stirred with the temperature thereof kept at about 5° C. by means of an ice bath. The properties of the resulting dispersion are essentially the same as those of the previous emulsion copolymer.

A class of interpolymers of considerable interest is based on ureidoalkyl vinyl ethers as used above of the formula

$$CH_2=CHOC_nH_{2n}NRCONH_2$$

wherein $C_nH_{2n}$ is an alkylene group of two to three carbon atoms and R is primarily hydrogen or a methyl group.

In place of such a ureidoethyl or ureidopropyl vinyl ether there may be used other ureidoalkyl vinyl ether, such as ureidoisobutyl vinyl ether or 2-ureidohexyl vinyl ether. In place of acrylates and/or methacrylates as above there may be used vinyl esters. For example, a terpolymer may be formed from ureidoethyl vinyl ether, vinyl chloride, and vinyl acetate. These terpolymers can be thermoset or be reacted with aldehydes and the products therefrom insolubilized.

Emulsion copolymers have been prepared containing 2–20% of ureidoisobutyl vinyl ether or 5 mole per cent of N-α-methylbenzyl-N-vinoxyethylurea with ethyl, butyl or Carbitol acrylates. These polymers when applied to wool fabrics at 5–7% applied solids and cured at 270° F. for 10 minutes in the presence of oxalic acid give complete shrinkage resistance for 300 minutes of laundering. An untreated control gives 40–60% area shrinkage in similar laundering. The most unusual effect is the complete freedom from harshness of hand in the treated fabrics. The materials handle and drape much like untreated wool with a desirable increase in fullness and springiness.

These emulsions are also useful as coatings for paper, shingles and other surfaces where they impart a tough, protective coating. They can be allowed to air-dry or if a higher degree of resistance is required may be baked at 100°–150° C.

*Example 48*

A mixture of 81.7 parts of vinyl acetate, 6.5 parts of ureidoethyl vinyl ether, and 200 parts of water is emulsified with four parts of sodium octylphenoxyethoxyethoxyethyl sulfonate. The mixture is warmed to 70° C. under a nitrogen atmosphere and treated with 0.5 part of ammonium persulfate and 0.5 part of piperidine. As the resulting copolymerization is exothermic, the temperature of the mixture is controlled by cooling and is kept below 100° C. There is thus formed a dispersion of copolymer.

The copolymer reacts with formaldehyde to give a methylol derivative which is of particular interest for textile finishing. The dispersion is also useful in the coating of paper and may be used as a binder in starch-clay compositions useful for coating paper.

*Example 49*

There are charged to a glass-lined autoclave 50.9 parts of vinyl chloride, 51.2 parts of butyl acrylate, 6.5 parts of ureidoethyl vinyl ether, 100 parts of dimethylformamide, and 0.1 part of dimethyl azodiisobutyrate. The mixture is heated under autogenous pressure to about 50° C. Copolymerization soon begins and is permitted to proceed at temperatures generated by the heat of reaction. The reaction is allowed to proceed for 12 hours. The autoclave is then cooled and the clear, viscous solution therein is poured into water. The terpolymer precipitates as a tough solid.

*Example 50*

A mixture of 5.3 parts of acrylonitrile, 68 parts of methyl acrylate, and 13 parts of ureidoethyl vinyl ether in 100 parts of isopropanol is heated under a nitrogen atmosphere to 65° C. Azodiisobutyronitrile in an amount of 0.3 part is added and the mixture is stirred and heated at about 65° C. for 12 hours. Upon addition of water to the reaction mixture terpolymer is precipitated as a rubbery solid. This terpolymer is soluble in acetone and other solvents.

A solution of the terpolymer is made in a mixture of methylene dichloride and toluene and to one half of this solution there are added 3.5 parts of butyraldehyde and 0.5 part of butylphosphoric acid. This solution is applied to a steel panel and is dried thereon. The panel is baked at 120° C. for a half hour. The film becomes tough and solvent-resistant.

The above interpolymer may be co-reacted with solvent-soluble butylated urea-formaldehyde resins. The resulting product can be pigmented and acid-catalyzed to provide baking enamels giving cured films of superior mar-resistance and toughness.

Copolymers of acrylonitrile and ureidoalkyl vinyl ethers are generally more readily soluble than polyacrylonitrile itself and are thus quite readily adaptable to the preparation of fibers. Introduction of polar hydrophilic groups into such polymers imparts to fibers formed therefrom a greater degree of crystallinity and a greater affinity for moisture than polyacrylonitrile itself or common modifications thereof. These modifications of polyacrylonitrile fibers contribute to the ease of dyeing and supply desirable qualities to fibers spun therefrom.

*Example 51*

A copolymer is prepared as above from 10 mole per cent of ureidoethyl vinyl ether and 90 mole per cent of acrylonitrile. The copolymer is soluble in dimethylformamide. Films formed therefrom are transparent and tough. They resemble cellophane somewhat, but have less water-sensitivity.

In the same way a copolymer is formed in solution from 30 mole per cent of ureidoethyl vinyl ether and 70 mole per cent of acrylonitrile. This copolymer is insoluble in pure dimethylformamide or in water but is soluble in a mixture of water and dimethylformamide.

*Example 52*

An interpolymer from ethyl acrylate (65 parts), ureidoethyl vinyl ether (5 parts), and acrylonitrile (30 parts) is formed by emulsion polymerization as in Example 14. Formaldehyde solution is mixed with the dispersion of interpolymer. An acid catalyst is added and films are formed from the mixture and dried at temperatures up to about 100° C. The resulting films are very hard and insoluble in acetone or hydrocarbon solvents.

*Example 53*

(a) There are mixed 128.7 parts of ureidoethyl vinyl ether, 1.6 parts of ureidoisobutyl vinyl ether, 150 parts of dimethylformamide, and 0.5 part of dimethyl azodiisobutyrate. The mixture is heated under nitrogen to 70° C. and held at about this temperature until copolymerization appears essentially complete, about 16 hours. A viscous solution is obtained. The copolymer is isolated by mixing the above solution with acetone. The copolymer is soluble in water and insoluble in alcohol.

(b) There are mixed 15.8 parts of ureidoisobutyl vinyl ether, 13 parts of ureidoethyl vinyl ether, 30 parts of dimethylformamide, and 0.5 part of dimethyl azodiisobutyrate. The mixture is heated under a nitrogen atmosphere to 70° C. and held at about this temperature for 20 hours. There is obtained a viscous solution of copolymer, which is separated as a gum upon addition of acetone. The copolymer is dried under reduced pressure at 60° C. to a white powder. This copolymer is soluble in water, but also has some solubility in alcohols.

(c) A mixture of 142 parts of ureidoisobutyl vinyl ether, 13 parts of ureidoethyl vinyl ether, 200 parts of dimethyl formamide, and 0.5 part of dimethyl azodiisobutyrate is heated under nitrogen at about 70° C. as above. There results a solution of copolymer which is precipitated with water. The copolymer is dried to a powdery white solid which is soluble in methanol and butanol and also soluble in mixtures of methanol and water.

By varying the proportions of the two monomers there can be prepared copolymers having a range of solubilities, varying from primarily water-soluble to solvent-soluble.

The above copolymers and similar combinations of ureidoalkyl vinyl ethers are useful for such purposes as imparting wet-strength to paper and as providing coating compositions. These copolymers have a high proportion of reactive urea groups which can be reacted thermally or with various reagents such as aldehydes.

*Example 54*

There are mixed 115 parts of isobutyl acrylate, 35.4 parts of 2-ureidooctadecyl vinyl ether, 150 parts of toluene, and 0.2 part of benzoyl peroxide. The reaction vessel containing this mixture is swept out with nitrogen and it is heated at 90° to 100° C. for two hours. At this time 0.1 part of benzoyl peroxide is added and heating is continued for two hours. Another 0.1 part of this catalyst is added and the mixture is again heated for two hours. There is thus obtained a thick, viscous solution of copolymer. This is soluble in oils and greases and serves as a thickener and stabilizer.

A similar copolymer in which dodecyl acrylate is substituted for the above isobutyl acrylate is useful as an additive for lubricating oils for depressing the pour point and improving the viscosity-temperature relationship.

Example 55

There are mixed under nitrogen in a steel autoclave 62.5 parts of vinyl chloride, 326 parts of 2-ureidohexadecyl vinyl ether, 400 parts of dimethylformamide, and one part of dimethyl azodiisobutyrate. The autoclave is heated for 16 hours at 65° C. Another part of catalyst is added and heating is continued for four hours. The viscous solution which results when applied to glass or steel panels gives tough, flexible films. When these films are treated with a solution of paraformaldehyde in butanol and butylphosphoric acid, an insoluble product results.

Example 56

An emulsion is prepared from the following substances: 48 parts of acrylonitrile, 32.6 parts of 2-ureidohexadecyl vinyl ether, 200 parts of water, 4 parts of mild soap, 0.3 part of potassium persulfate and 0.1 part of morpholine. The emulsion is kept between 20° and 30° C. while copolymerization takes place. The resulting dispersion of copolymer is applied to steel panels which are dried and baked at 125° C. A tough, rubbery coating results. It is resistant to solvents and exhibits good adhesion.

Example 57

There are mixed 41.2 parts of 1-phenyl-2-ureidoethyl vinyl ether, 80 parts of ethyl acrylate, 150 parts of ethyl acetate, and 0.2 part of benzoyl peroxide. The reaction vessel containing this charge is swept out with nitrogen and it is heated to 90° C. for two hours. Addition is made of 0.1 part of benzoyl peroxide and heating is continued for an hour, when another 0.1 part portion of the catalyst is added. Heating is continued for four hours. The copolymer obtained is tough and flexible. It reacts with benzaldehyde and other aldehydes in the presence of acid.

By procedures such as have been illustrated in the above examples there may be prepared interpolymers from a ureidoalkyl vinyl ether and other polymerizable vinylidene compound. If desired, two or more ureidoalkyl vinyl ethers may be used and/or more than one of the other polymerizable vinylidene compounds may likewise be used in the formation of interpolymers of this invention.

The term vinylidene is here used to define the group $CH_2=C=$ which is attached directly to a functional or activating group and includes compounds having the structures $CH_2=C(R)R'$ and $CH_2=CHR$, where at least one of R and R' is a functional group, such as ester, ether, nitrile, halogens, carboxy, amido, etc. Vinylidene compounds may be used in which more than one vinylidene group occurs.

The copolymers of ureidoalkyl vinyl ethers and other polymerizable vinylidene compounds find a great variety of uses, such as in coatings, sheetings, moldings, castings, impregnating compositions, sizings, binders, fibers, etc., and also as intermediates for forming chemically modified products of many types.

We claim:

1. A compound of the formula $$CH_2=CHOAN(R)CONH_2$$

wherein A is an alkylene group of two to eighteen carbon atoms, at least two thereof occurring between oxygen and nitrogen, and R is a member of the class consisting of hydrogen and monovalent hydrocarbon groups which contain not over eighteen carbon atoms.

2. A compound of the formula $$CH_2=CH-O-C_nH_{2n}-NHCONH_2$$

wherein n is an integer from two to eighteen, there being at least two carbon atoms between oxygen and nitrogen atoms.

3. A compound of the formula $$CH_2=CH-O-CH_2CH_2NHCONH_2$$

4. A compound of the formula $$CH_2=CH-O-CH(CH_3)CH_2NHCONH_2$$

5. A compound of the formula $$CH_2=CH-O-CH_2C(CH_3)_2NHCONH_2$$

6. A compound of the formula $$CH_2=CH-O-C_nH_{2n}-N(R)CONH_2$$

R being an alkyl group of not over 10 carbon atoms and n being an integer from two to eighteen, there being at least two carbon atoms between the oxygen and nitrogen atoms.

7. A compound of the formula

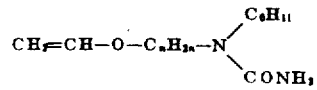

the $C_6H_{11}$ group being the cyclohexyl group and n being an integer from two to eighteen, there being at least two carbon atoms between the oxygen and nitrogen atoms.

8. A process for preparing ureidoalkyl vinyl ethers which comprises mixing together a water-soluble metal cyanate and an ether of the formula $$CH_2=CHOANHR$$

wherein A is an alkylene group of two to eighteen carbon atoms at least two of which occur between oxygen and nitrogen and R is a member of the class consisting of hydrogen and monovalent hydrocarbon groups and adding a strong non-oxidizing acid to the above mixture while maintaining the pH of the resulting mixture at a value of at least 6.8 and the temperature between 0° and 50° C.

9. A process for preparing ureidoalkyl vinyl ethers which comprises mixing together approximately equivalent amounts of a water-soluble metal cyanate and an ether of the formula $$CH_2=CHOANHR$$

wherein A is an alkylene group of two to eighteen carbon atoms at least two of which occur between oxygen and nitrogen and R is a member of the class consisting of hydrogen and monovalent hydrocarbon groups and adding to this mixture an aqueous 2% to 40% solution of a strong non-oxidizing acid while maintaining the pH of the resulting mixture at a value of at least 6.8 and the temperature between 0° and 50° C.

10. The process of claim 9 wherein the cyanate is an alkali metal cyanate.

11. A composition of matter comprising a polymer of a compound of the formula $$CH_2=CHOAN(R)CONH_2$$

wherein A is an alkylene group of two to eighteen carbon atoms, at least two thereof occurring between oxygen and nitrogen, and R is a member of the class consisting of hydrogen and monovalent hydrocarbon groups which contain not over ten carbon atoms.

12. A composition of matter comprising a polymer of an ether of the formula $$CH_2=CHOCH_2CH_2NHCONH_2$$

13. A composition of matter comprising a polymer of an ether of the formula $$CH_2=CHOCH(CH_3)CH_2NHCONH_2$$

14. A composition of matter comprising a polymer of an ether of the formula $$CH_2=CHOCH_2C(CH_3)_2NHCONH_2$$

15. A composition of matter comprising a polymer of an ether of the formula $$CH_2=CH-O-C_nN_{2n}-N(R)CONH_2$$

wherein R is a hydrocarbon group of not over 10 carbon atoms and n in an integer from two to eighteen, there being at least two carbon atoms between the nitrogen and oxygen atoms.

16. A composition of matter comprising a copolymer from an ether of the formula $$CH_2=CH-O-AN(R)CONH_2$$

wherein A is an alkylene group of two to eighteen carbon atoms, at least two thereof occurring between oxygen and nitrogen, and R is a member of the class consisting of hydrogen and monovalent hydrocarbon groups which contain not over ten carbon atoms, and at least one other copolymerizable vinylidene compound 17. A copolymer according to claim 16 in which the vinylidene compounds is a monovinylidene compound.

18. A copolymer according to claim 17 in which the monovinylidene compound is a vinyl ester.

19. A copolymer according to claim 17 in which the monovinylidene compound is an ester of an acid selected from the group consisting of acrylic acid and methacrylic acid.

20. A copolymer according to claim 17 in which the monovinylidene compound is acrylonitrile.

References Cited in the file of this patent

UNITED STATES PATENTS

| | | |
|---|---|---|
| 1,633,392 | Boedecker | June 21, 1927 |
| 2,421,233 | Auchincloss et al. | May 27, 1947 |
| 2,689,844 | Melamed | Sept. 21, 1954 |

OTHER REFERENCES

Sidgwick: "The Organic Chemistry of Nitrogen," page 324, published by Oxford, 1937.

UNITED STATES PATENT OFFICE

CERTIFICATE OF CORRECTION

Patent No. 2,734,890 February 14, 1956

Newman M. Bortnick et al.

It is hereby certified that error appears in the printed specification of the above numbered patent requiring correction and that the said Letters Patent should read as corrected below.

Column 5, line 17, for "-amino" read -- -aminoethyl --; column 15, line 71, for "acylic" read -- acyclic --; column 17, line 32, for "or" read -- of --; line 36, for "methacylate" read -- methacrylate --; column 18, line 69, for "axodiisobutyronitrile" read -- azodiisobutyronitrile --.

Signed and sealed this 17th day of April 1956.

(SEAL)
Attest:

E. J. MURRY

Attesting Officer

ROBERT C. WATSON
Commissioner of Patents